United States Patent
Sagherian

(10) Patent No.: US 10,259,479 B1
(45) Date of Patent: Apr. 16, 2019

(54) GAME CART

(71) Applicant: Altan Safe Outdoors Inc., Markham (CA)

(72) Inventor: Rafi Sagherian, Markham (CA)

(73) Assignee: Altan Safe Outdoors Inc., Markham (CA)

( * ) Notice: Subject to any disclaimer, the term of this patent is extended or adjusted under 35 U.S.C. 154(b) by 27 days.

(21) Appl. No.: 15/802,678

(22) Filed: Nov. 3, 2017

(51) Int. Cl.
*B62B 1/00* (2006.01)
*B62B 1/20* (2006.01)
*B62B 5/06* (2006.01)
*B62B 1/22* (2006.01)

(52) U.S. Cl.
CPC ............... *B62B 1/208* (2013.01); *B62B 1/22* (2013.01); *B62B 5/068* (2013.01); *B62B 2202/42* (2013.01)

(58) Field of Classification Search
None
See application file for complete search history.

(56) References Cited

U.S. PATENT DOCUMENTS

| | | | | |
|---|---|---|---|---|
| 4,017,091 A * | 4/1977 | Wallen | ................... | A63B 55/57 280/30 |
| 5,879,022 A * | 3/1999 | Winton | ................... | A63B 55/00 280/655 |
| 7,914,015 B2 * | 3/2011 | Tompkins | ............... | B62B 1/266 280/47.18 |
| 8,794,644 B2 * | 8/2014 | Chen | ......................... | B62B 1/22 280/47.12 |
| 9,185,952 B1 * | 11/2015 | Turney | ...................... | A45C 5/14 |
| 2013/0200595 A1 * | 8/2013 | Mackay | .................. | B62B 1/002 280/655 |

* cited by examiner

*Primary Examiner* — Paul N Dickson
*Assistant Examiner* — Hilary L Johns
(74) *Attorney, Agent, or Firm* — Sand, Sebolt & Wernow Co., LPA

(57) ABSTRACT

A game cart for hauling or carrying a large game animal is collapsible between a deployed position and a collapsed position. The game cart includes an extension member moveably connected with a frame. The extension member rotates about a pivot axis to collapse first and second legs inwardly towards the frame. First and second wheels may be removed from operational stub axles on the first and second legs and may be stored on storage stub axles attached to the extension member. When the game cart is collapsed, the wheels are carried by the extension member so as to allow the entire cart to be carried by a strap. After the cart is carried by a hunter to a remote location, the cart is deployed by reversing the steps of collapsing the cart. The cart carries a hunted large game animal, after a hunt, from a remote location in the wilderness.

20 Claims, 13 Drawing Sheets

GAME CART

BACKGROUND

Technical Field

The present disclosure relates generally to carts configured to haul or carry items. More particularly, the present disclosure relates to a hand drawn cart that is collapsible between a deployed position and a collapsed position sized to carry a large game animal usually from remote locations deep in the wilderness back to civilization.

Background Information

Large game animals are hunted for both sport and survival. Typically, large game animals, such as deer, elk, bear, moose, bison, panthers, or the like are larger than the hunter. Thus, when a hunter successfully hunts an animal, they are left with the task of either butchering or preserving the animal. Sometimes a hunter will field dress an animal. Other times, a hunter will carry or drag an animal out of the wilderness.

In situations where a hunter desires to carry or drag the animal out of the wilderness, the task is burdensome due to the size of the animal. Sometimes a hunter will use motorized vehicles to carry the animal. However, often times motorized vehicles, such as ATVs or UTVs, cannot always access remote areas of wilderness, or it may not be desirable to drive a motorized vehicle because the game animals may be scared away due to the sound thereof. Further, many land owners and/or State-owned land rules prohibit the use motorized vehicles (such as ATVs or UTVs) thereon.

SUMMARY

Thus, a need continues to exist for a device to assist a hunter with carrying or dragging or hauling a large game animal after a hunt. The present disclosure addresses these and other issues by providing a collapsible game cart sized to carry or drag or haul a large game animal that has been hunted. The game cart can be carried by the hunter in its collapsed position. The game cart can be deployed in remote locations for carrying or dragging or hauling a large game animal back to civilization after a hunt.

In one aspect, an embodiment of the present disclosure may provide a game cart comprising: a frame extending from a first end to a second end; a first leg coupled to the frame extending outwardly in a first direction; a first operational stub axle connected to the first leg; a first wheel removably attached to the first operational stub axle; a second leg coupled to the frame extending outwardly in a second direction; a second operational stub axle connected to the second leg; a second wheel removably attached to the second operational stub axle; an extension member movably connected to a frame, wherein the extension member is movable between an extended first position and a collapsed second position; and a first storage stub axle on the extension member connected to at least one of the first wheel or the second wheel in the collapsed second position. This embodiment or another exemplary embodiment may provide a second storage stub axle on the extension member connected to the other of the first wheel or the second wheel in the collapsed position. This embodiment or another exemplary embodiment may provide a first surface on the extension member, wherein the first and second storage stub axles extend outwardly from the first surface to a terminal free end. This embodiment or another exemplary embodiment may provide wherein the first and second storage stub axles are parallel to each other and perpendicular to the extension member. This embodiment or another exemplary embodiment may provide wherein the second storage stub axle is located above the first storage stub axle on the extension member. This embodiment or another exemplary embodiment may provide wherein the first and second storage stub axles face a different direction in the collapsed second position. This embodiment or another exemplary embodiment may provide a first game retaining member attached to the frame adjacent the first end; a second game retaining member attached to the frame adjacent the second end; and wherein the first and second game retaining members are sized to carry a large game animal. This embodiment or another exemplary embodiment may provide teeth on the first game retaining member adapted to grip a portion of the large game animal carried by the game cart. This embodiment or another exemplary embodiment may provide a first strap operatively coupled to the first game retaining member, wherein the strap has a length sized to accommodate and extend fully around the large game animal; and a second strap operatively coupled to the second game retaining member, wherein the second strap has a length sized to accommodate and extend fully around the large game animal carried by the cart. This embodiment or another exemplary embodiment may provide a first support member connected to the extension member and the first leg, wherein the first support member moves the first leg in response to the extension member moving from the extended first position to the collapsed second position; and a second support member connected to the extension member and the second leg, wherein the second support member moves the second leg in response to the extension member moving from the extended first position to the collapsed second position.

In another aspect, an embodiment of the present disclosure may provide a method comprising removing a first wheel from a first operational stub axle on a game cart sized to carry a large game animal; removing a second wheel from a second operational stub axle on the game cart; collapsing the game cart from a deployed position to a collapsed position; installing the first wheel on a first storage stub axle; and installing the second wheel on a second storage stub axle. This embodiment or another exemplary embodiment may provide pivoting an extension member from an extended first position to a collapsed second position, wherein collapsing the game cart occurs in response to pivoting the extension member, wherein the first and second storage stub axles are connected to the extension member. This embodiment or another exemplary embodiment may provide wherein removing the first wheel from the first operational stub axle is accomplished by pulling the first wheel in a first direction, and removing the second wheel from the second operational stub axle is accomplished by pulling the second wheel in a second direction opposite the first direction. This embodiment or another exemplary embodiment may provide wherein installing the first wheel on the first storage stub axle is accomplished by pushing the first wheel in a third direction, wherein the third direction is orthogonal to the first and second directions. This embodiment or another exemplary embodiment may provide carrying the game cart with the first wheel connected to the first storage stub axle and the second wheel connected to the second storage stub axle. This embodiment or another exemplary embodiment may provide loading a large game animal onto the game cart in the deployed position; and moving the game cart from a first location to a second location while carrying the large game animal. This embodiment or another exemplary embodiment may provide moving the first wheel positioned along a first axis to a second axis orthogonal to the first axis; moving the second wheel positioned along the first axis to a third axis orthogonal to the first axis, wherein the third axis is parallel to the second axis; wherein the first and second operational stub axles are coaxially aligned along the first axis, and the first storage stub axle is aligned along the second axis and the second storage stub axle is aligned along the third axis. This embodiment or another exemplary embodiment may provide wherein the second and third axes are orthogonal to the first axis in both the deployed position and the collapsed position of the game cart. This embodiment or another exemplary embodiment may provide pivoting an extension member around a fourth axis, wherein the fourth axis is parallel to the first axis and orthogonal to the second axis and orthogonal to the third axis.

In another aspect, an embodiment of the present disclosure may provide a game cart for hauling or carrying a large game animal that is collapsible between a deployed position and a collapsed position. The game cart includes an extension member moveably connected with a frame. The extension member rotates about a pivot axis to collapse first and second legs inwardly towards the frame. First and second wheels may be removed from operational stub axles on the first and second legs and may be stored on storage stub axles attached to the extension member. When the game cart is collapsed, the wheels are carried by the extension member so as to allow the entire cart to be carried by a strap. After the cart is carried by a hunter to a remote location, the cart is deployed by reversing the steps of collapsing the cart. The cart carries a hunted large game animal, after a hunt, from a remote location in the wilderness.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
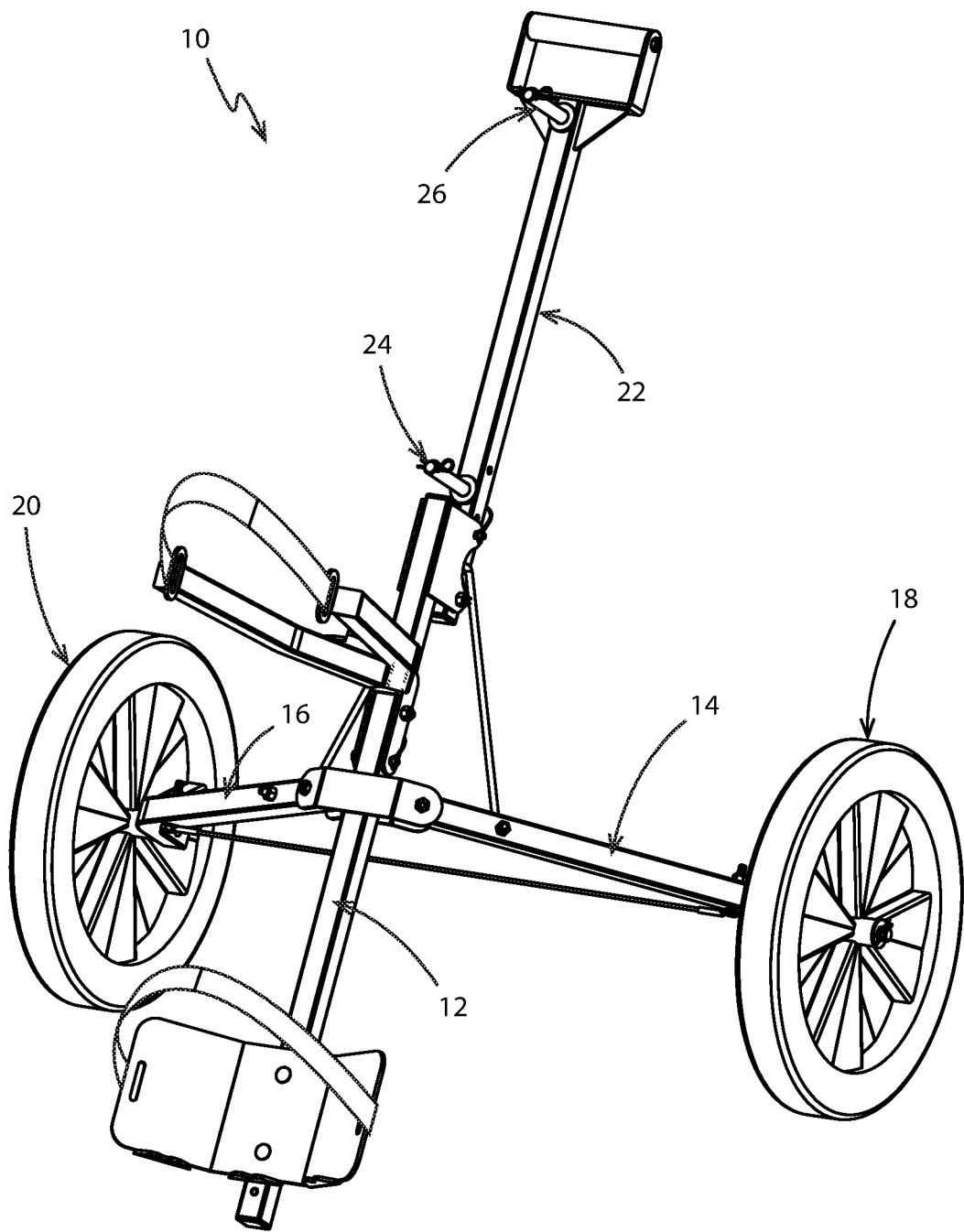
FIG. 1 (FIG. 1) is a front perspective view of a game cart in accordance with the present disclosure.

As depicted throughout the figures, a game cart in accordance with the present disclosure is shown generally at 10. In one embodiment, the game cart 10 may include a frame 12, a first leg 14, a second leg 16, a first wheel 18, a second wheel 20, an extension member 22, a first storage stub axle 24, and a second storage stub axle 26.

Frame 12 includes a first end 28 and second end 30. Frame 12 extends in a generally linear manner between first end 28 and second end 30. Frame 12 includes an upwardly facing first surface 32 opposite a downwardly facing second surface 34. In one particular embodiment, first surface 32 is substantially continuous and uninterrupted between first end 28 and second end 30. Similarly, second surface 34 may extend in a substantially continuous and uninterrupted manner between first end 28 and second end 30. In one particular embodiment, first and second surfaces 32, 34 are generally planar and offset parallel to each other. In this particular instance, frame 12 may be fabricated from a square tube manufactured from a rigid material so as to provide strength and rigidity to game cart 10. In one particular embodiment, frame 12 is a hollow member such as an aluminum tube having a square-shaped cross section. However, it is to be entirely understood that different cross-sectional configurations of frame 12 are entirely possible.

Figure 4:
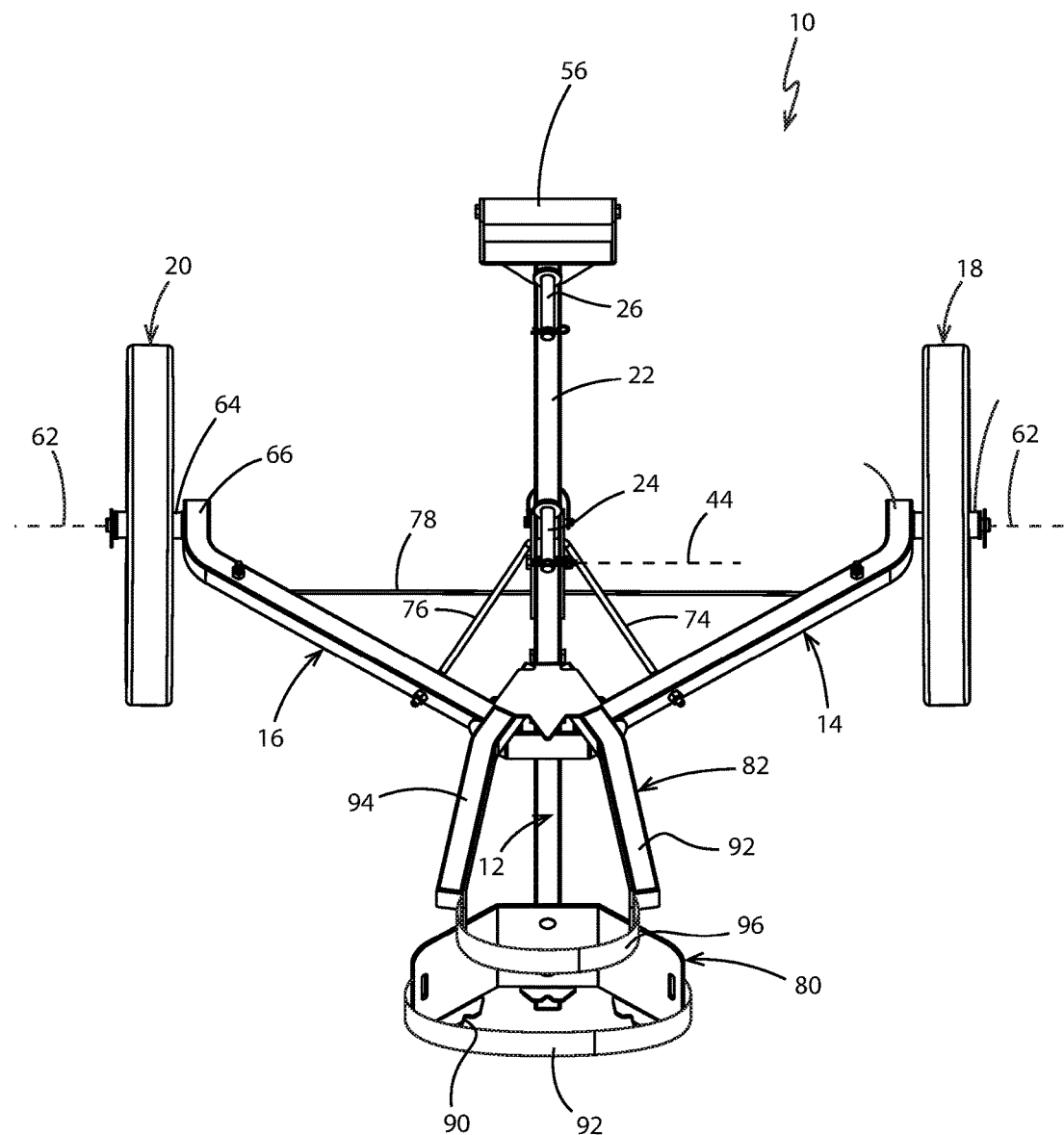
FIG. 4 (FIG. 4) is a top plan view of the game cart in the deployed position.
Figure 5:
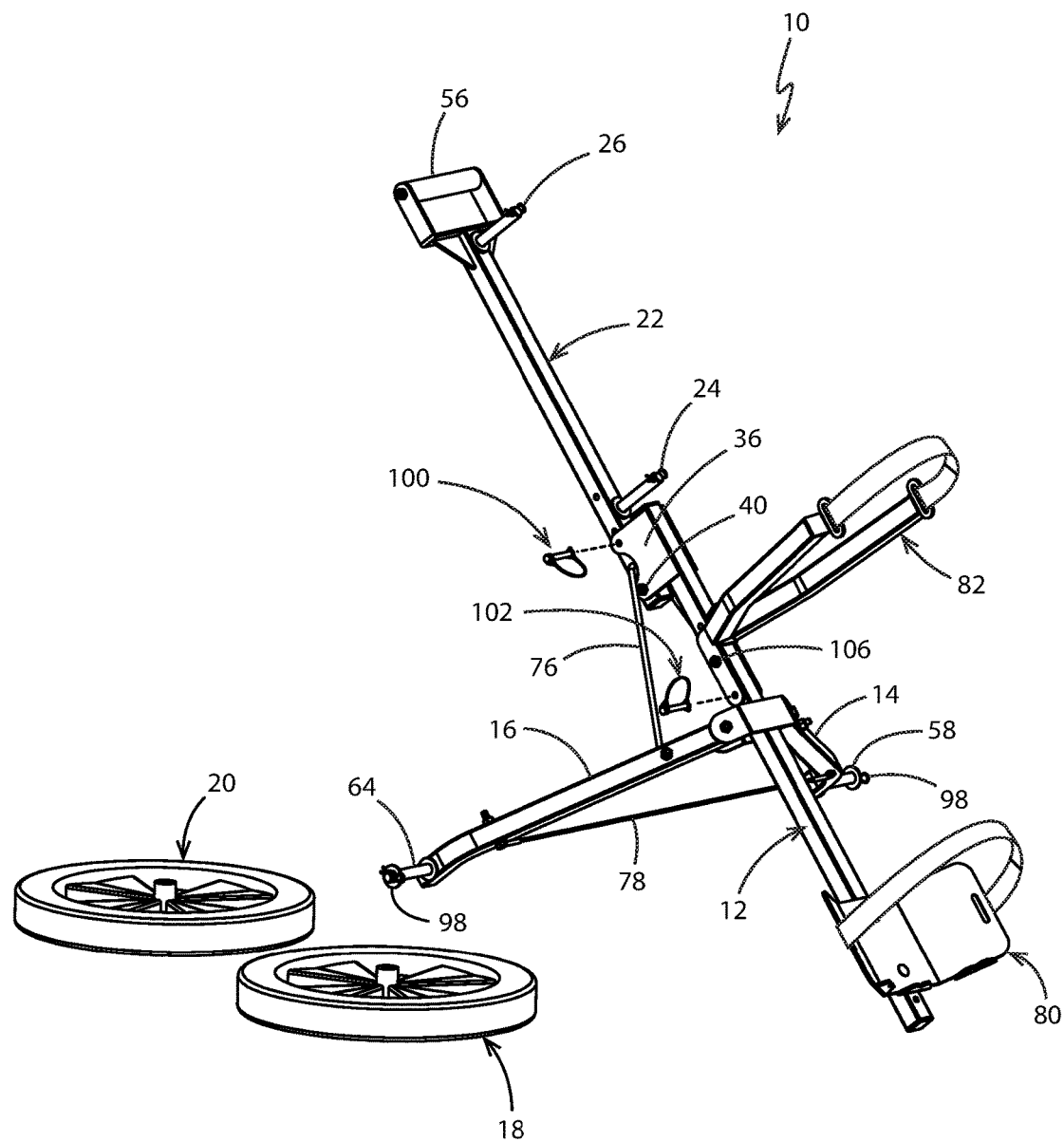
FIG. 5 (FIG. 5) is a perspective view of the game cart with the wheels removed from the operational stub axles and a pair of pins removed.
Figure 8:
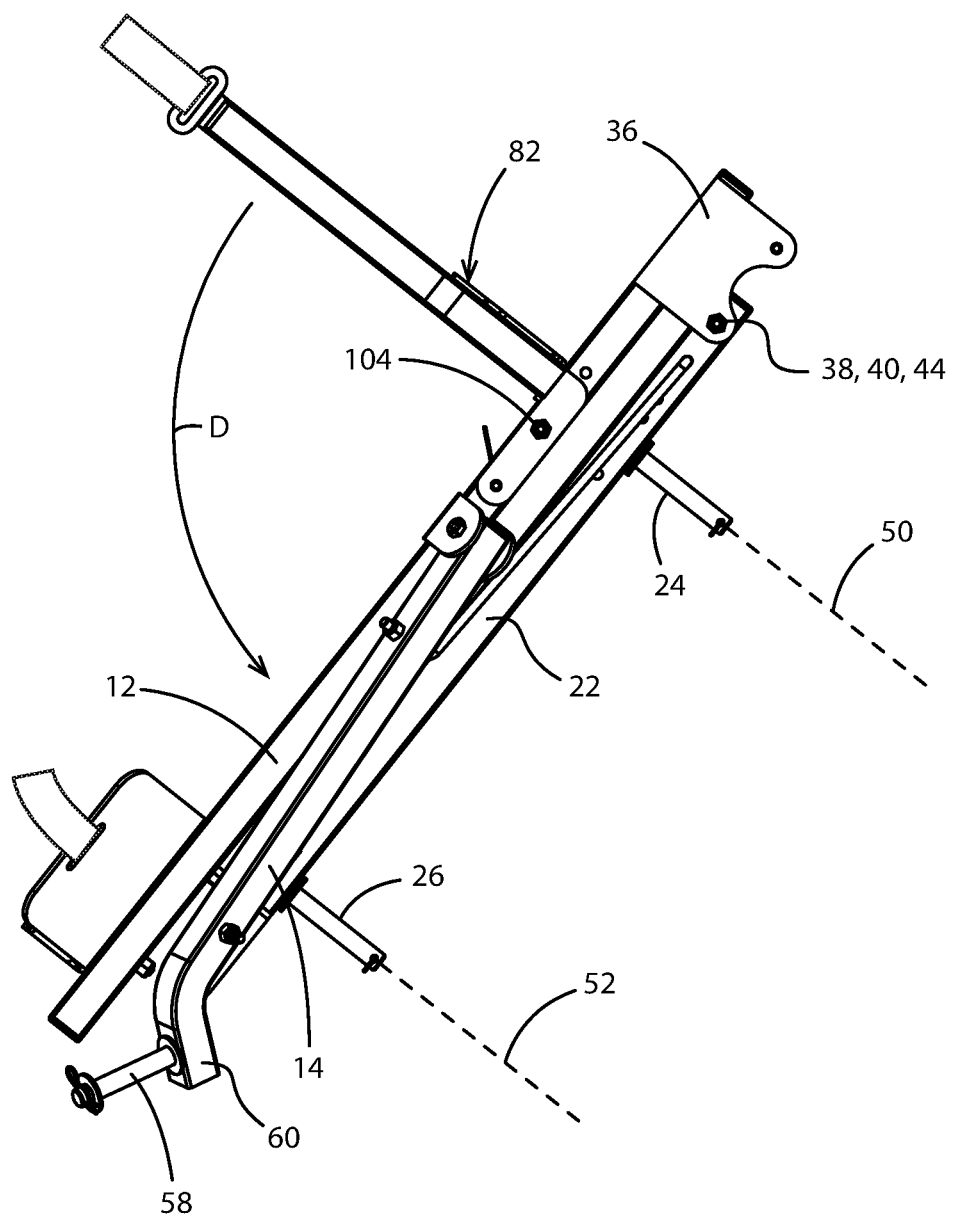
FIG. 8 (FIG. 8) is a side elevation view of the game cart moving from the deployed position to the collapsed position.

Extension member 22 is movably connected to the frame 12. In one particular embodiment, a flange 36 is rigidly connected with the frame 12 adjacent the second end 30. Flange 36 extends in the direction of the second surface 34 and extends in a cantilevered manner therebeyond. In one particular embodiment, one end of the flange 36 is coplanar with first surface 32 of frame 12. Flange 36 may include a plurality of transversely aligned bores defined in flange 36 and extending fully therethrough. In one particular embodiment, flange 36 is formed from two planar members located on each side of the frame 12. Accordingly, the transversely aligned bores 38 define a passage way for a bolt or other elongated rod to fit therethrough. The bolt 40 extends through a first end 42 of extension member 22. Bolt 40 connects extension member 22 to the flange 36 and establishes a pivoting relationship therebetween. Accordingly, extension member 22 is movable between an extended first position (FIG. 2) and a collapsed second position (FIG. 8). More particularly, the extension member 22 is pivotable between the extended first position and the collapsed second position about the pivot axis defined by bolt 40. The axis defined by bolt 40 is shown generally as pivot axis 44 (FIG. 4). Pivot axis 44 is aligned transversely relative to game cart 10.

Extension member 22 includes an upwardly facing first surface 46 and a downwardly facing second surface 48. First surface 46 on extension member 22 faces a similar direction as first surface 32 on frame 12. Second surface 48 on extension member 22 faces a similar direction as second surface 34 on frame 12. Extension member 22 may be formed from a similar material having a similar cross section as frame 12. For instance, extension member 22 may have a square-shaped cross section and be formed from a rigid metal, such as aluminum, tubing defining a hollow interior bore. In the extended position, extension member 22 is offset parallel to the frame 12. After moving to the collapsed second position, the extension member 22 remains offset parallel to the frame 12, but is offset at a different location. Thus, the movement of the extension member 22 approximates 180 degrees of rotational or pivotal movement about the pivot axis 44.

Figure 2:
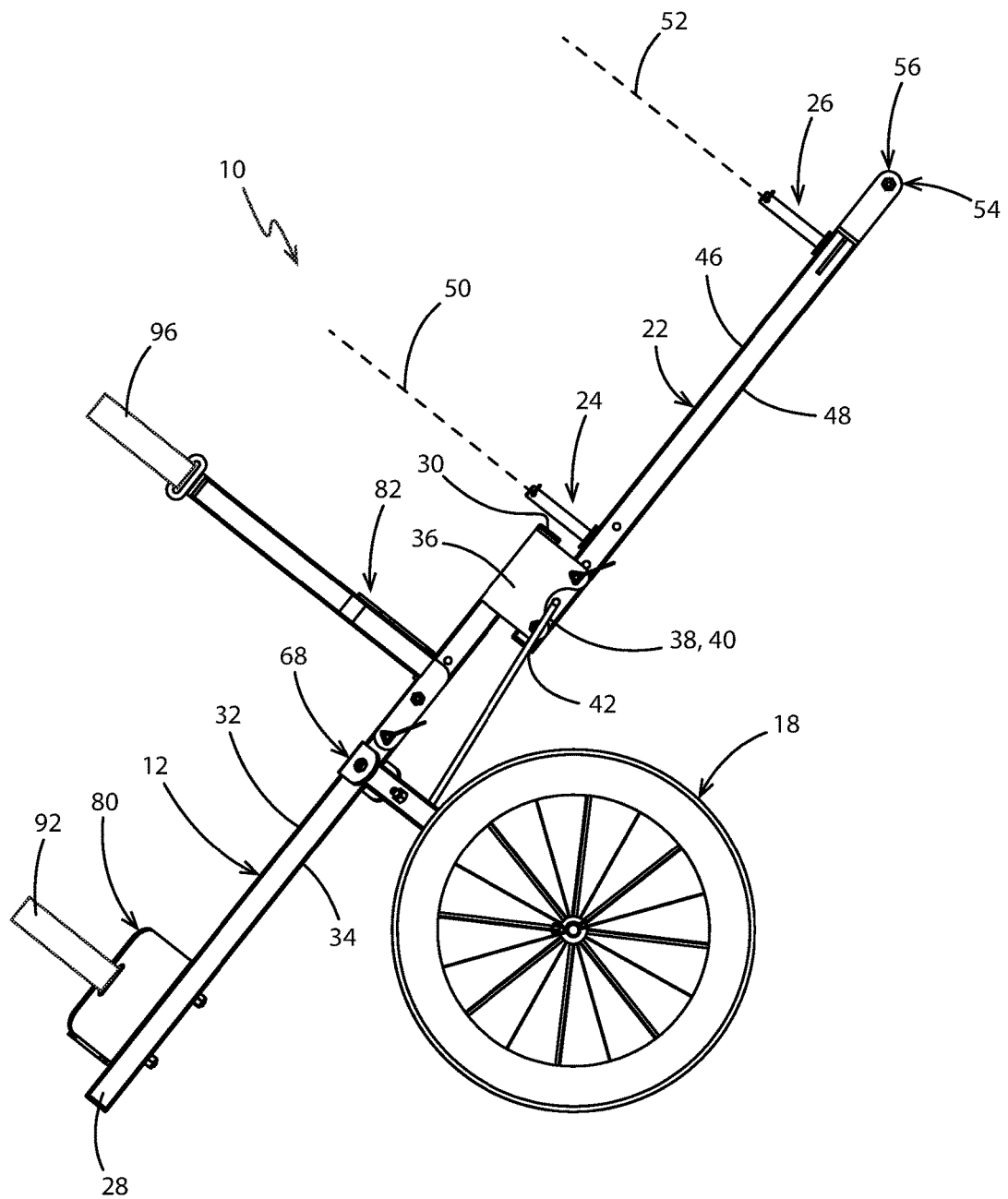
FIG. 2 (FIG. 2) is a side elevation view of the game cart in accordance with the present disclosure in a deployed position.

First storage stub axle 24 extends in a cantilevered manner from a rigid connection with first surface 46 on extension member 22. First storage stub axle 24 is positioned adjacent a first end 42 of extension member 22; however, it is located offset from the second end 30 of frame 12. A slight gap is formed between the first storage stub axle 24 and the second end 30 of frame 12. Additionally, the length in which the first storage stub axle 24 extends in a cantilevered manner from first surface 46 on extension member 22 to a terminal free end is a distance that extends beyond that of first surface 32 of frame 12. First storage stub axle 24 extends in a cantilevered manner linearly along a first storage axis 50. First storage axis 50 is orthogonal to pivot axis 44. The second storage stub axle 26 extends in a cantilevered manner linearly along a second storage axis 52. Second storage axis 52 is offset parallel to first storage axis 50 and is also orthogonal to pivot axis 44. Second storage stub axle 26 is located adjacent the second end 54 of extension member 22. Second storage stub axle 26 extends in a cantilevered manner to a terminal free end in a direction similar to that of first storage stub axle 24. Similarly, the terminal end of second storage stub axle 26 extends beyond that of the first surface 32 of frame 12 when the game cart 10 is in its deployed position (FIG. 2). The first storage stub axle 24 and the second storage stub axle 26 each extend perpendicularly from the first surface 46 of extension member 22. A handle 56 may define the second end 54 of extension member 22. Handle 56 may extend transversely across a portion of the game cart 10 relative to extension member 22. In one particular embodiment, the second storage stub axle 26 is located vertically above a portion of a support flange connecting the handle 56 with the extension member 22.

Figure 3:
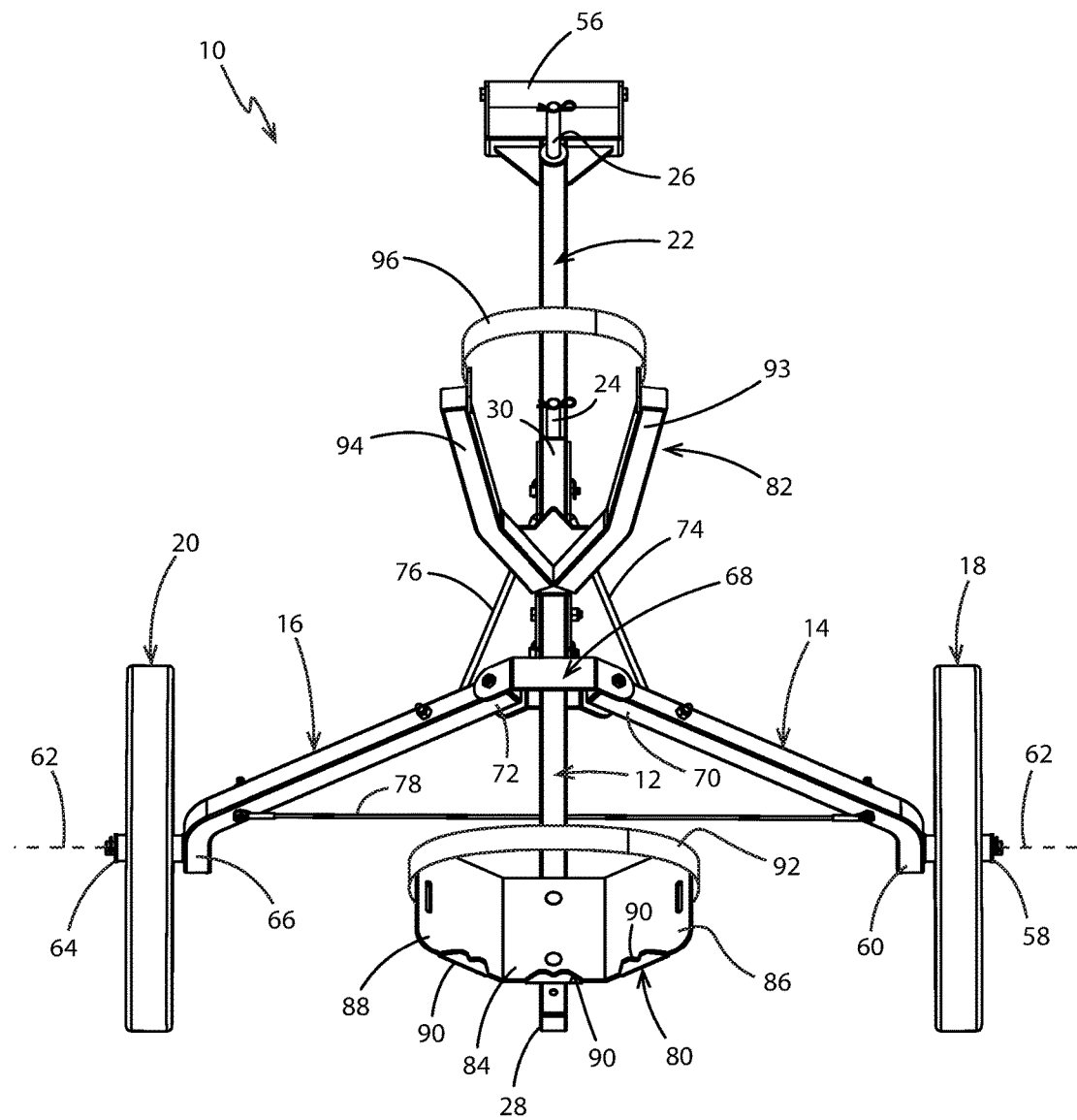
FIG. 3 (FIG. 3) is a front elevation view of the game cart in the deployed position.
Figure 10:
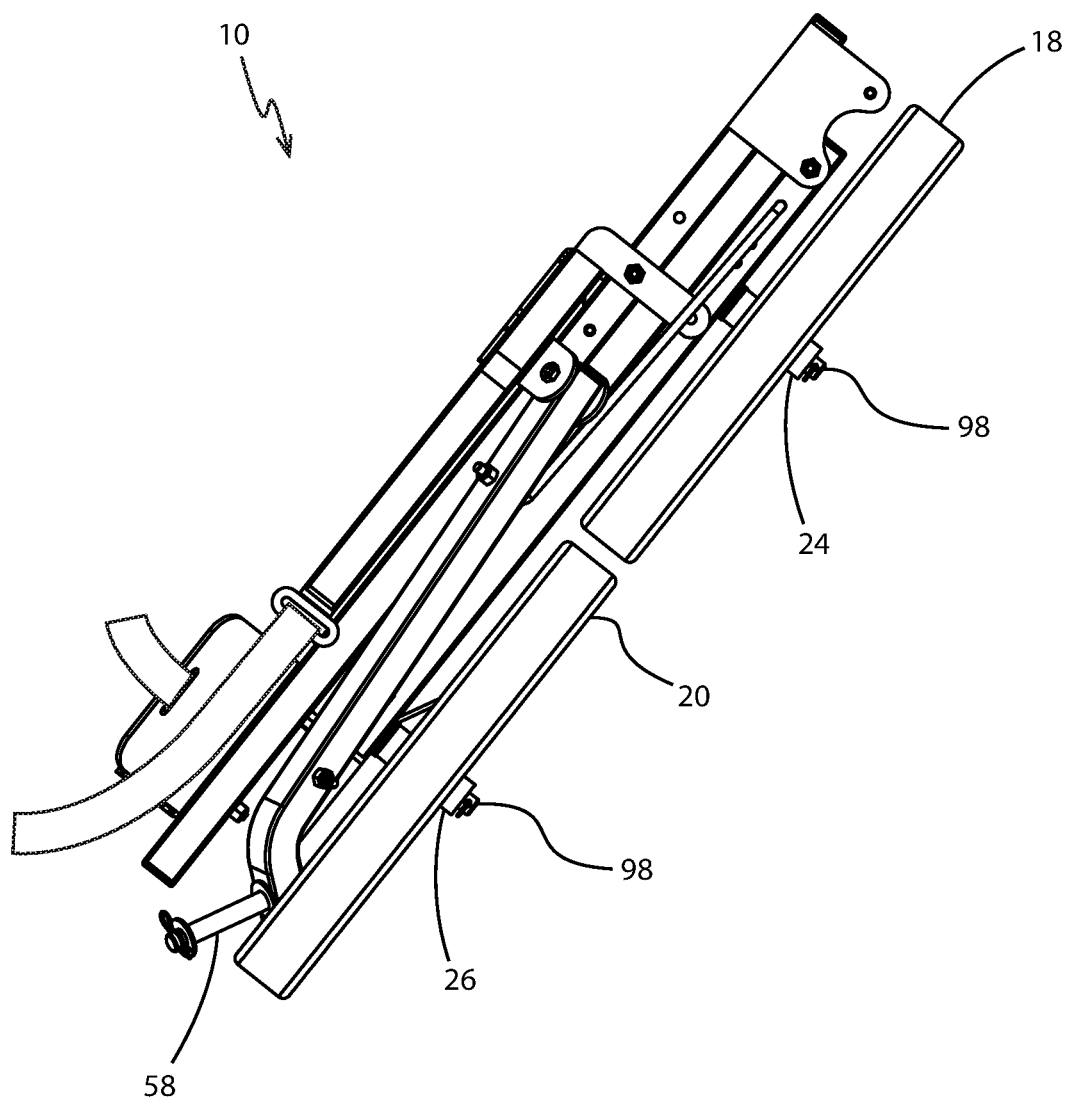
FIG. 10 (FIG. 10) is a side view of the game cart in the collapsed position.

As depicted in FIG. 3, a first operational stub axle 58 is connected to a lower end 60 of first leg 14. First operational stub axle 58 extends in a cantilevered manner transversely away from lower end 60 establishing an operational axis 62 about which first wheel 18 rotates when the game cart 10 is in the deployed position. Operational axis 62 is orthogonal to the first storage axis 50 and the second storage axis 52. Additionally, operational axis 62 is offset parallel to pivot axis 44. Similar to the first leg 14, the second leg 16 includes a second operational stub axle 64 extending in a cantilevered manner from an end 66 of second leg 16. Second operational stub axle 64 extends linearly along operational axis 62 in a direction opposite that of first operational stub axle 58. The second operational stub axle 64 is rotatably connected with second wheel 20. A flange bracket 68 is connected with frame 12 intermediate the first end 28 and the second end 30. Flange bracket 68 defines two slots, wherein one slot is located on one side of the frame 12 and the other slot is located on the other side of frame 12. One of the slots in flange bracket 68 receives an upper end 70 of first leg 14 therethrough. An upper end 72 of second leg 16 is received in the other slot in flange bracket 68. A pivot connection is established between upper end 70 of first leg 14 and flange bracket 68. Similarly, a pivot connection is established between the upper end 72 on second leg 16 and flange bracket 68. A first rigid push arm 74 extends between the extension member 22 and the first leg 14. Similarly, a second rigid push arm 76 extends between the extension member 22 and the second leg 16. Additionally, a support wire 78 may extend transversely between first leg 14 and second leg 16. Support wire 78 is adapted to support the first and second legs 14, 16 when the game cart 10 is in its deployed position, but creates slack and releases tension therein when the game cart 10 is collapsed from its deployed position to a collapsed position (FIG. 10). The first rigid push arm 74 may also be referred to as a first support member 74 inasmuch as it is connected to the extension member 22 and the first leg 14. As will be described in greater detail below, the first support member 74 moves the first leg 14 in response to the extension member 22 moving from its extended first position to its collapsed second position. Additionally, the second rigid push arm 76 may also be referred to as a second support member 76 inasmuch as it is connected to the extension member 22 and the second leg 16. The second support member 76 moves the second leg 16 in response to the extension member 22 moving from its extended first position to its collapsed second position.

The first support member 74 (i.e., first rigid push arm 74) is connected with first leg 14 via a free connection. The free connection between first support member 74 and first leg 14 enables the first support member 74 to freely rotate or pivot or otherwise move at the union during pushing movement or urging forces extending through first support member 74 during the collapsing of the extension member as will be described in greater detail below. Similarly, the first support member 74 (i.e., first rigid push arm 74) is connected with extension member 22 via a free connection. This also enables the first support member 74 to freely rotate or pivot or move in response to the extension member 22 moving from the extended first position to the collapsed second position. The second support member 76 is similarly coupled with the second leg 16 and the extension member 22 via free connections.

Game cart 10 may further include a first game retaining member 80 and a second game retaining member 82. The first game retaining member 80 is attached to frame 12 adjacent first end 28. First game retaining member 80 and second game retaining member 82 are sized to carry a large game animal, as will be described in greater detail below. The first game retaining member 80 may include a central flange 84 rigidly connected to frame 12 and two outer flanges 86, 88. First flange 86 extends upwardly and outwardly from a rigid connection with central flange 84. Second flange 88 extends upwardly and outwardly in an opposite direction from a rigid connection with central flange 84. In one particular embodiment, the flanges 84, 86, 88 may be fabricated from a uniform continuous monolithic member, such as metal, that is bent into the shape as shown and described herein. The first game retaining member 80 may further include teeth 90 which extend upwardly and outwardly in a cantilevered manner from portions of the flanges 84, 86, 88. In one particular embodiment, teeth 90 are positioned towards the first end 28 of frame 12. First game retaining member 80 may further include a first strap 92 extending from first flange 86 to second flange 88 and spanning over the central flange 84 of first game retaining member 80. First strap 92 may be releasably tightened so as to be adjustable in order to carry a large game animal thereon. In one particular embodiment, the first game retaining member 80 is located between the first end 28 and flange bracket 68 on frame 12. The second game retaining member 82 is located between second end 30 and flange bracket 68 relative to frame 12. Stated otherwise, flange bracket 68, which pivotably connects the first and second legs 14, 16 to frame 12, is located between the first game retaining member 80 and the second game retaining member 82.

Second game retaining member 82 includes a first post 93 and a second post 94. The first and second posts 93, 94 extend upwardly and outwardly from frame 12 in a cantilevered manner. The first and second posts 93, 94 extend away from each other so as to define a generally V-shaped configuration with a second strap 96 extending between the terminal ends of the first and second posts 93, 94. The second strap 96 is adjustable so as to releasably secure a portion of the large game animal between the first and second posts 93, 94 when the game cart 10 is in its deployed position. In one example, each post 93, 94 includes a lower portion that angles away from the frame 12 at an angle in a range from about 30 degrees to about 60 degrees. Each post 93, 94 includes an upper portion connected to the lower portion. The upper portion of each post 93, 94 angles at a shallower or smaller angle relative to frame 12. At least one spiked tooth may extend upwardly into the space defined between first and second posts 93, 94 which is configured to impale the large game animal 110 and retaining the animal thereon between the first and second posts 93, 94. The spiked tooth may also be supported by a transversely extending support flange which provides additional stability to the first and second posts 93, 94.

The first strap 92 on the first game retaining member 80 has a length that is sized to accommodate and extend fully around the large game animal that is being carried by the first game retaining member 80 when the game cart 10 is in its deployed position. Similarly, second strap 96 that is connected to the second game retaining member 82 has a length that is sized to accommodate and extend fully around the large game animal carried by the game cart 10. In one particular embodiment, the strap 92 is connected with or near the upper terminal ends of the posts 93,94.

Figure 3A:
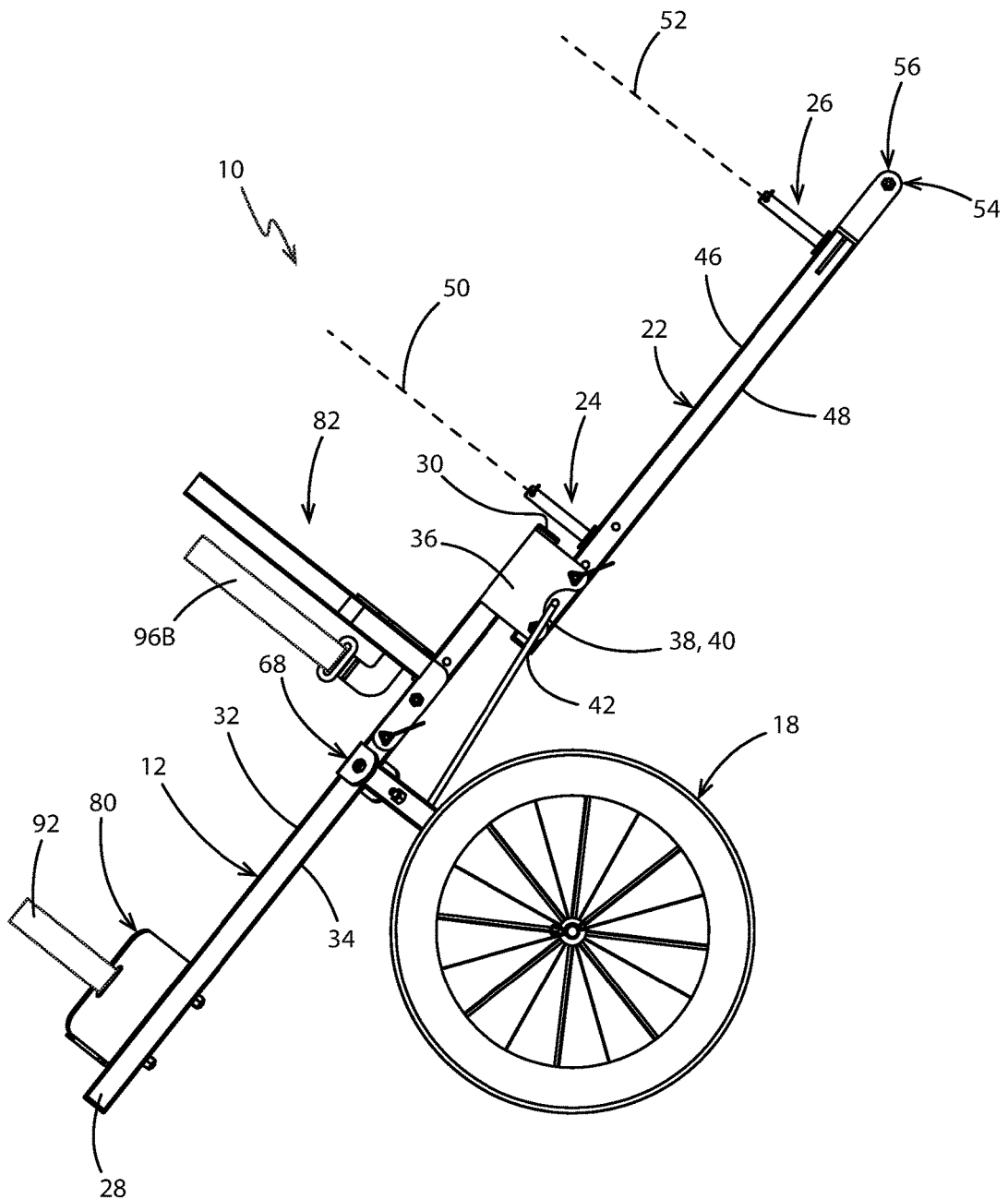
FIG. 3A (FIG. 3A) is a side elevation view of the game cart having a strap located in an alternative location relative to a game retaining member coupled with a frame.

FIG. 3A depicts an alternative location of a strap 96B connected with the second game retaining member 82 near the lower ends of the first and second posts 93,94. The configuration of the strap 96B shown in FIG. 3A allows for the game animal (more particularly, the game animal's neck) to be ledge towards the lower end of the V-shaped configuration of the posts 93,94. This ensures that the animal is secured by the at least one spiked tooth located near the bottom of the V-shaped configuration of the posts 93,94.

Regardless of the location of strap 96 (or 96B), the strap may be fabricated a strong material that is sufficiently flexible so as to be secured around the game animal hauled or carried by the cart. In one particular embodiment, a nylon webbing material is used to form strap 96 (or 96B). The strap may further have one or more connectors or clips attached thereto to effectuate the connection of the strap to the game animal. Clearly, the length of the strap is fixed but its size relative to the animal can vary by cinching the strap, in a known manner, via a slot in one of the connectors.

FIG. 5-FIG. 10 depict the operational embodiments of game cart 10. More particularly, the game cart 10 is shown as being able to be collapsed from its deployed position (FIG. 2) to a collapsed position (FIG. 10). When the game cart 10 is in its collapsed position, it may be carried by an operator 108 (see FIG. 11) for easy transport. The first wheel 18 may be removed from first operational stub axle 58. In one particular embodiment, the removal of the first wheel 18 from first operational stub axle 58 is accomplished by removing a pin 98 from the first operational stub axle 58. With the pin 98 removed, the first wheel 18 may be slid off in a first direction along operational axis 62 and laid flat on the ground for temporary storage. Similar to this, a pin 98 may be removed from the second operational stub axle 64 in order to remove the second wheel 20. The second wheel 20 may be slid off from the second operational stub axle 64 in an opposite second direction along operational axis 62 and temporarily stored while the remaining steps of collapsing the game cart 10 are accomplished. A connecting pin 100 is removed from a retaining connection with flange 36 and extension member 22. The connecting pin 100, when installed, is parallel to bolt 40 defining the pivot axis 44. The connecting pin 100 acts as a removable retaining member that retains and locks the extension member 22 in its extended position. When the connecting pin 100 is removed from flange 36 and extension member 22, the extension member 22 is free to pivot about pivot axis 44 via bolt 40. Additionally, a second pin 102 may be removed from its connection with second game retaining member 82 and the frame 12. When the second pin 102 is removed, the second game retaining member 82 is free to pivot about secondary pivot axis 104 established by bolt 106. When the second pin 102 is removed, the second game retaining member 82 is pivoted about secondary pivot axis 104 such that the second game retaining member 82 lies generally flush against the first surface 32 of frame 12.

Figure 6:
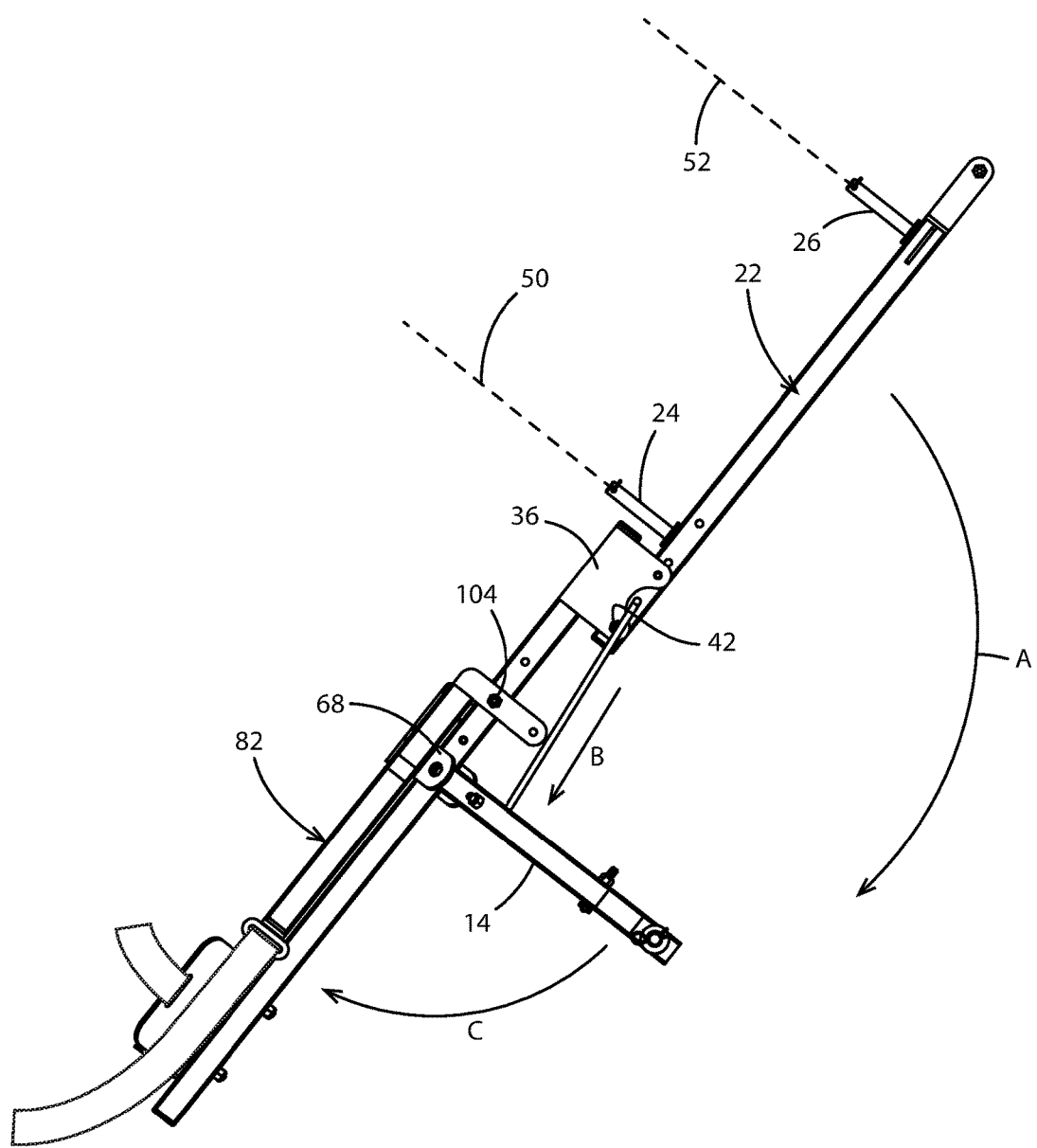
FIG. 6 (FIG. 6) is a side operational view of the game cart being moved from the deployed position to a collapsed position.
Figure 7:
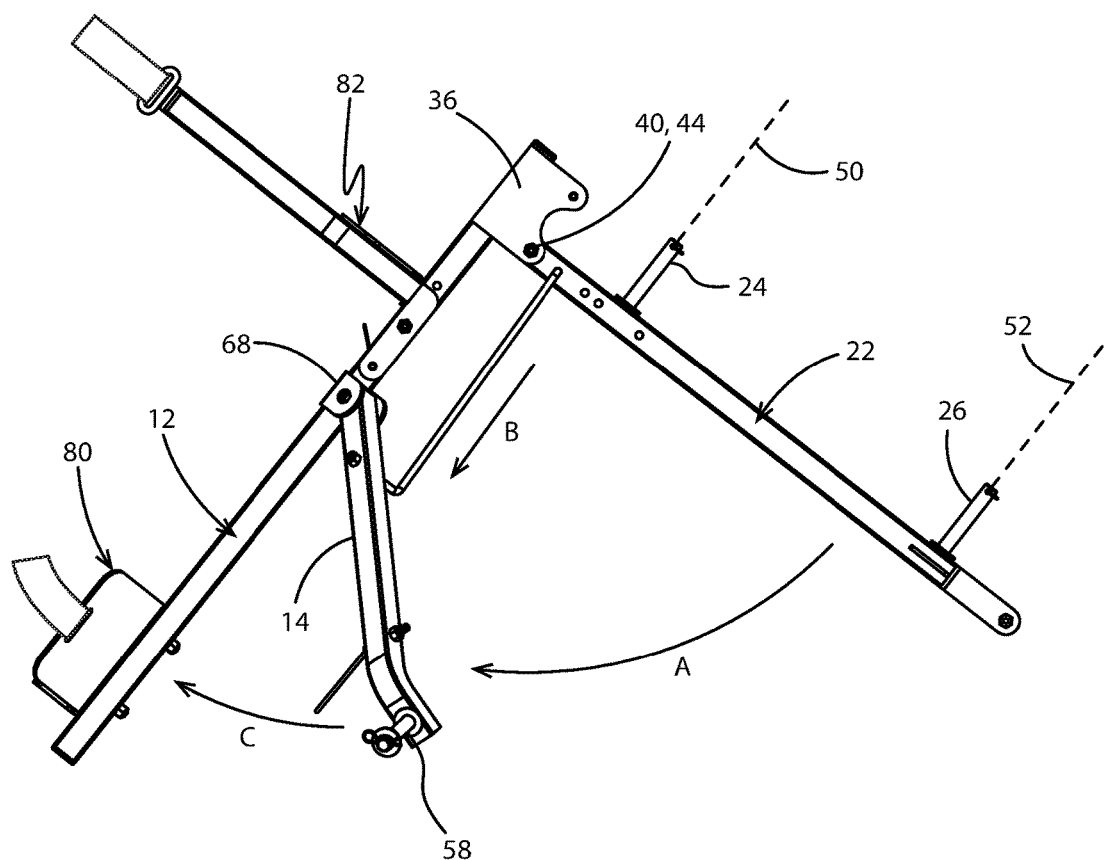
FIG. 7 (FIG. 7) is a side operational view of the game cart moving from the deployed position to the collapsed position.

FIG. 6 and FIG. 7 depict the operational movements of collapsing the game cart 10 from the deployed position to the collapsed position. More particularly, the game cart 10 collapsing from the deployed position to the collapsed position is effectuated by pivoting the extension member 22 from its extended position to its collapsed position. With the connecting pin 100 removed, the extension member 22 is free to rotate about pivot axis 44 in the direction of arrow A as indicated in FIG. 6 and FIG. 7. As the extension member 22 rotates in the direction of arrow A, the first and second support members 74, 76 push, respectively, the first leg 14 and the second leg 16 as indicated by arrow B. The pushing of the first and second legs 14, 16 by the first and second support members 74, 76 causes the first and second legs 14, 16 to rotate about their pivoted connections with flange bracket 68 as shown by arrow C. When the rotation of extension member 22 in the direction of arrow A is complete, the second surface 48 on extension member 22 lies substantially flush with the second surface 34 of frame 12. Additionally, the first and second legs 14, 16 lie substantially flush against the collapsed extension member 22.

FIG. 8 depicts that the rotation of the second game retaining member 82 does not need to occur prior to the collapsing of the extension member 22. FIG. 8 depicts that the second game retaining member 82 may be collapsed in the direction of arrow D subsequent to the movement; more particularly, the pivoting movement of extension member 22 from its extended first position to its collapsed second position.

Figure 9:
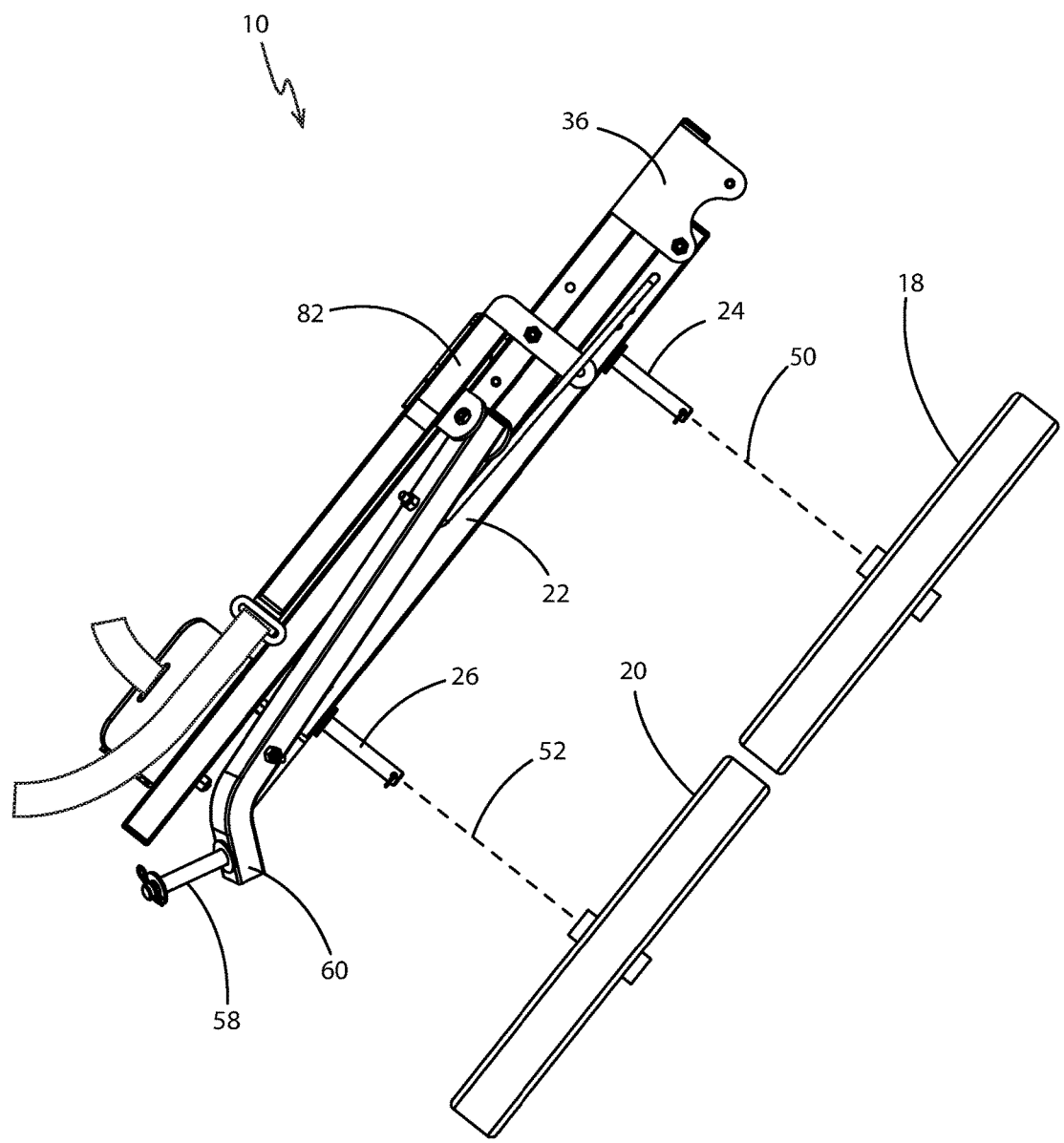
FIG. 9 (FIG. 9) is a side operational view of the game cart moving from the deployed position to the collapsed position.

In each instance, the game cart 10 is collapsed as shown in FIG. 9. After the game cart 10 has been collapsed, the first and second wheels 18, 20 may be reinstalled, respectively, on the first and second storage stub axles 24, 26. Stated otherwise, removing the first wheel 18 from the first operational stub axle 58 was accomplished by pulling the first wheel 18 in a first direction along operational axis 62, and removing the second wheel 20 from the second operational stub axle 64 was accomplished by pulling the second wheel 20 in an opposite second direction along operational axis 62 opposite that of the first direction associated with first wheel 18. Installing of the first wheel 18 on the first storage stub axle 24 occurs in a third direction along first storage axis 50 as shown in FIG. 9. Similarly, the installation of second wheel 20 on the second storage stub axle 26 occurs along second storage axis 52. Stated otherwise, installing the first wheel 18 on the first storage stub axle 24 is accomplished by pushing the first wheel 18 in a third direction that is orthogonal to the first and second directions associated with removing the first and second wheels 18, 20 from the first and second operational stub axles 58, 64.

Figure 11:
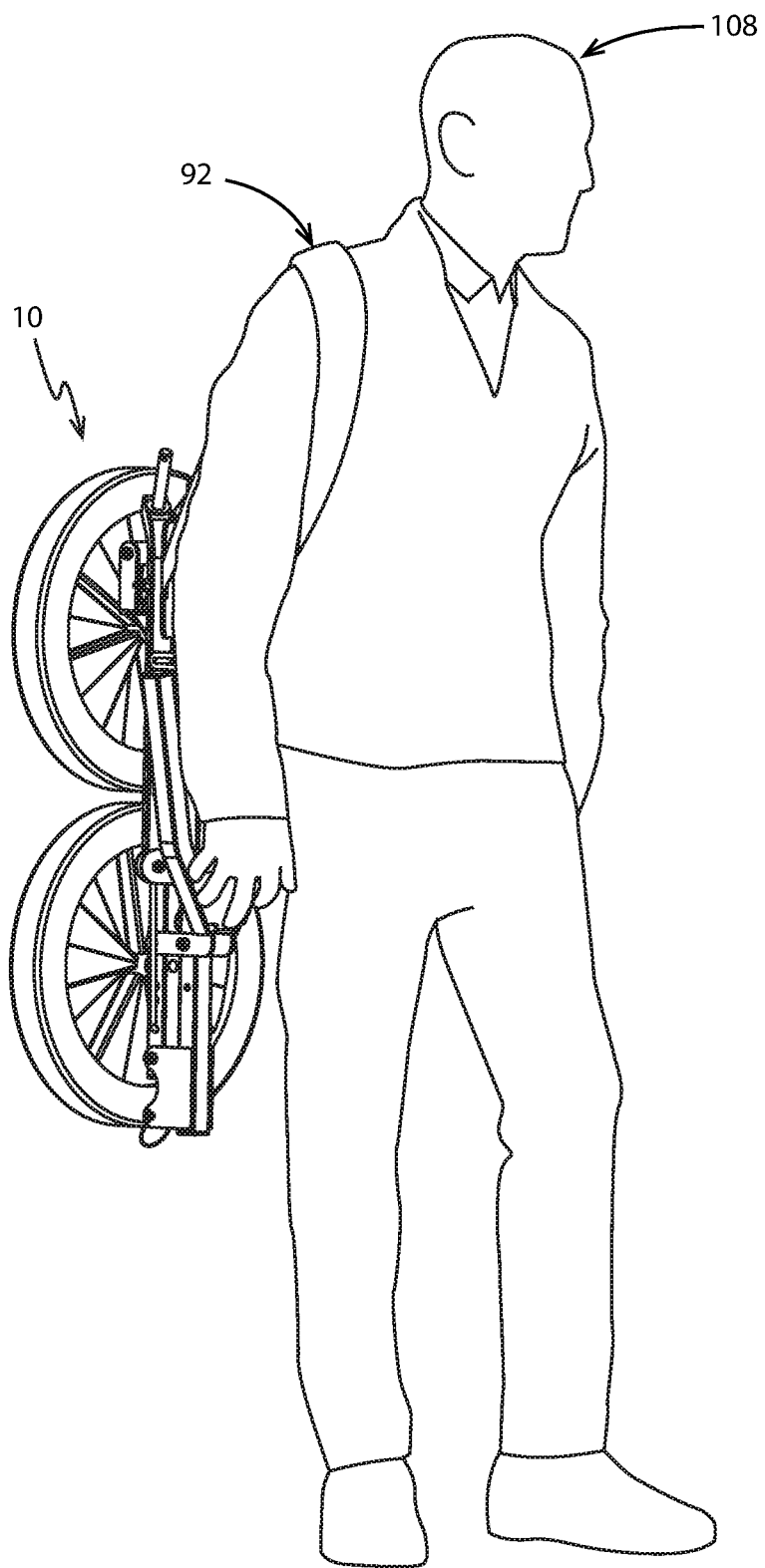
FIG. 11 (FIG. 11) is a diagrammatic view of the game cart in the collapsed position being carried and transported by an operator.

FIG. 10 shows that the pin 98 may be reinstalled on the first and second storage stub axles 24, 26 so as to releasably secure the first wheel 18 and the second wheel 20 respectively thereto when the game cart 10 is in its collapsed position. As depicted in FIG. 11, when the game cart 10 is in its collapsed position, a person 108 may carry the game cart 10 via the first strap 92 on the first game retaining member 80. Alternatively, the second strap 96 could be utilized to carry the game cart 10 in its collapsed position.

In one particular embodiment, it is envisioned that the game cart 10 will be first carried in its collapsed position to a desired location. In one example, a desired location may be into a remote area of wilderness, such as where a hunter is located hunting a large game animal. One exemplary large game animal is a deer; however, other large game animals are entirely possible within the scope of this disclosure. For example, other non-limiting examples of large game animals may include bears (such as Alaskan brown bears, black bears, grizzly bears, and polar bears) or large cats (such as cougars, pumas, mountain lions, and panthers) or deer (such as white tailed deer, mule deer, and black tailed deer) or elk (such as Rocky Mountain elk) or caribou (such as mountain caribou or barren ground caribou) or moose, or bison, or musk ox, or goat, or antelope, or sheep (such as California big horn sheep, dall sheep, desert big horn sheep, Rocky Mountain big horn sheep, and stone sheep), or even aquatic mammals (such as walrus, seal, or the like). After the hunter, such as person 108, has obtained or hunted the large game animal 110 and killed the same for sport or survival purposes, the game cart 10 may be transitioned from its collapsed position to its deployed position.

Figure 12:
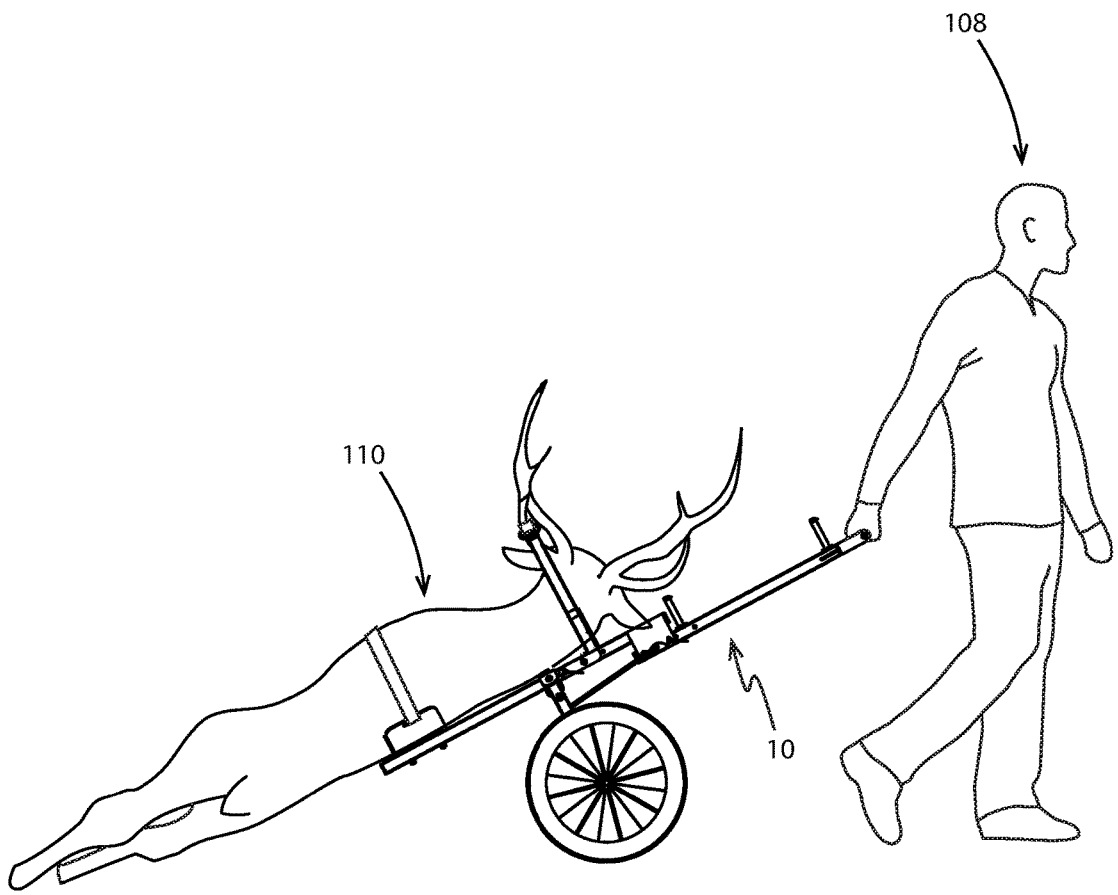
FIG. 12 (FIG. 12) is a diagrammatic view of the game cart in the deployed position being utilized to haul or carry a large game animal in accordance with one aspect of the present disclosure.

Deployment of the game cart 10 occurs in a manner opposite that which was described above with respect to collapsing the game cart 10. More particularly, the hunter or person 108 will remove the first and second wheels 18, 20 from their releasable connections with the first and second storage stub axles 24, 26. Thereafter, the second game retaining member 82 will be pivoted about bolt 106 and secured in place via second pin 102. Then the extension member 22 will be rotated about the pivot axis 44. The rotation of extension member 22 about pivot axis 44 draws the first and second legs 14, 16 outwardly because of their pivot connection with flange bracket 68. The pulling occurs via first and second support members 74, 76 which are connected with extension member 22 as it rotates about pivot axis 44. Extension member 22 may be locked in place by connecting pin 100 with flange 36. The first and second wheels 18, 20 may be reinstalled on the first and second operational stub axles 58, 64, respectively. Once the game cart 10 has been moved into its deployed position in a remote location, such as deep in the wilderness, the large game animal 110 may be loaded onto the first and second game retaining members 80, 82. Thereafter, the first and second straps 92, 96 may be wrapped around the large game animal 110 in order to secure the same to the game cart 10. Thereafter, the person 108 may carry the large game animal 110 out of the wilderness by wheeling it as supported by the game cart 10 as shown in FIG. 12.

The game cart 10 should be fabricated from materials capable of supporting the large game animal 110. Particularly, it is within the scope of the present disclosure that the game cart 10 be capable of carrying an animal of over 1000 lbs. The hunter 108 should be able lift the heavy game animal based on the length of the extension member 22 which acts as a lever arm to pivot the weight of the animal over the axis 62 associated with the wheels 18, 20 installed on the operational stub axles acting as a fulcrum. In one particular embodiment, the longitudinal length of the extension member 22 is similar to the frame 12. Thus, when the extension member 22 is in extended first position, the length of the cart 10 in the deployed position is nearly double the length of the cart in the collapsed position.

In one example, game cart 10 differs conventional collapsible carts based on its structure which enables cart 10 to carry a large game animal and its removable wheels which are stored on the first and second storage stub axles located on the extension member between the handle and the frame, amongst other distinctions and benefits.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A game cart comprising:
a frame extending from a first end to a second end;
a first leg coupled to the frame extending outwardly in a first direction;
a first operational stub axle connected to the first leg;
a first wheel removably attached to the first operational stub axle;
a second leg coupled to the frame extending outwardly in a second direction;
a second operational stub axle connected to the second leg;
a second wheel removably attached to the second operational stub axle;
an extension member movably connected to the frame, wherein the extension member is movable between an extended first position and a collapsed second position; and
a first storage stub axle cantilevered from the extension member, and the first storage stub axle is connected to the first wheel when the extension member is in the collapsed second position.

2. The game cart of claim 1, further comprising:
a second storage stub axle cantilevered from the extension member, and the second storage stub axle is connected to the second wheel when the extension member is the collapsed second position.

3. The game cart of claim 2, further comprising:
a pivot axis about which the extension member moves from the first position to the second position; and
a first surface on the extension member, wherein the first and second storage stub axles extend outwardly from the first surface to a terminal free end along a first storage axis and a second storage axis respectively;
wherein the first storage axis is orthogonal to the pivot axis.

4. The game cart of claim 3, further comprising:
wherein the first and second storage stub axles are parallel to each other and perpendicular to the extension member.

5. The game cart of claim 4, further comprising:
wherein the second storage stub axle is located above the first storage stub axle on the extension member in the extended first position.

6. The game cart of claim 5, further comprising:
wherein the first and second storage stub axles face a similar direction in the collapsed second position.

7. The game cart of claim 6, further comprising:
a first game retaining member attached to the frame adjacent the first end;
a second game retaining member attached to the frame adjacent the second end; and
wherein the first and second game retaining members are sized to carry a large game animal.

8. The game cart of claim 7, further comprising:
teeth on the first game retaining member adapted to grip a portion of the large game animal carried by the game cart.

9. The game cart of claim 7, further comprising:
a first strap operatively coupled to the first game retaining member, wherein the first strap has a length sized to accommodate and extend fully around the large game animal; and
a second strap operatively coupled to the second game retaining member, wherein the second strap has a length sized to accommodate and extend fully around the large game animal carried by the game cart.

10. The game cart of claim 3, further comprising:
a first surface of the frame; and
wherein the terminal free end of the first and second storage stub axles extends beyond the first surface of the frame when the extension member is in the extended first position.

11. The game cart of claim 2, further comprising:
a handle connected to the extension member and supported by a support flange; and
wherein the second storage stub axle is located vertically above a portion of the support flange when the extension member is in the extended first position.

12. A game cart comprising:
a frame extending from a first end to a second end;
a first leg coupled to the frame extending outwardly in a first direction;
a first operational stub axle connected to the first leg;
a first wheel removably attached to the first operational stub axle;
a second leg coupled to the frame extending outwardly in a second direction;
a second operational stub axle connected to the second leg;
a second wheel removably attached to the second operational stub axle;
an extension member pivotably connected to the frame between an extended first position and a collapsed second position;
a first game retaining member attached to the frame adjacent the first end;
a second game retaining member attached to the frame adjacent the second end;
wherein the first and second game retaining members are sized to carry a large game animal; and
at least one tooth on the first game retaining member to grip a portion of the large game animal carried by the game cart.

13. The game cart of claim 12, further comprising:
teeth extended upwardly and outwardly in a cantilevered manner from the first game retaining member to grip the large game animal.

14. The game cart of claim 13, wherein the teeth are positioned towards the first end of the frame.

15. The game cart of claim 12, wherein the first game retaining member includes:
a central flange rigidly connected to the frame;
an outer first flange that extends upwardly and outwardly from a rigid connection with central flange; and
an outer second flange that extends upwardly and outwardly in an opposite direction from a rigid connection with the central flange.

16. The game cart of claim 15, wherein the flanges are fabricated from a uniform continuous monolithic member.

17. The game cart of claim 12, wherein the second game retaining member includes:
a first post and a second post that extend upwardly and outwardly from the frame in a cantilevered manner and extend away from each other to define a generally V-shaped configuration.

18. The game cart of claim 17, wherein the second game retaining member further includes:
a strap extending between the terminal ends of the first and second posts to releasably secure a portion of the large game animal between the first and second posts when the game cart is in the extended first position.

19. The game cart of claim 17, wherein the second game retaining member further includes:
a lower portion of each post that angles away from the frame at an angle in a range from about 30 degrees to about 60 degrees; and
an upper portion of each post connected to the lower portion respectively, wherein the upper portion of each post angles at a shallower angle relative to the frame.

20. The game cart of claim 17, wherein the second game retaining member further includes:
at least one spiked tooth that extends upwardly into a space defined between first and second posts.

* * * * *